(12) United States Patent
Thompson (10) Patent No.: US 9,418,408 B1
(45) Date of Patent: Aug. 16, 2016

(54) DYNAMIC RANGE OPTIMIZATION

(71) Applicant: Kerry J. Thompson, North Salt Lake, UT (US)

(72) Inventor: Kerry J. Thompson, North Salt Lake, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/806,496

(22) Filed: Jul. 22, 2015

(51) Int. Cl.
  *G06K 9/00* (2006.01)
  *G06T 5/00* (2006.01)
  *G06T 5/40* (2006.01)
  *G06K 9/46* (2006.01)

(52) U.S. Cl.
  CPC .............. *G06T 5/009* (2013.01); *G06K 9/4642* (2013.01); *G06T 5/40* (2013.01); *G06T 2207/20208* (2013.01)

(58) Field of Classification Search
  CPC ........... G06T 5/001; G06T 5/009; G06T 5/40; G06T 7/408; G06K 9/4647; H04N 1/4074
  See application file for complete search history.

(56) References Cited

U.S. PATENT DOCUMENTS

| | | | | |
|---|---|---|---|---|
| 6,724,943 B2* | 4/2004 | Tsuchiya | ............... | H04N 5/208 348/E5.076 |
| 6,826,310 B2* | 11/2004 | Trifonov | ................... | G06T 5/40 382/168 |
| 7,319,787 B2* | 1/2008 | Trifonov | ................... | G06T 5/40 382/168 |
| 7,352,352 B2* | 4/2008 | Oh | ....................... | G09G 3/3406 345/102 |
| 7,355,611 B2* | 4/2008 | Bianchi | .............. | H04N 5/23293 345/690 |
| 9,307,162 B2* | 4/2016 | Peng | .................... | H04N 5/2351 |
| 2004/0100478 A1* | 5/2004 | Bianchi | .............. | H04N 5/23293 345/690 |
| 2015/0254808 A1* | 9/2015 | Maack | .................. | G06T 3/4084 345/660 |

OTHER PUBLICATIONS

Zuiderveld, Karel, "Contrast Limited Adaptive Histogram Equalization" Graphics Gems IV, Academic Press Professional, Inc., 1994, chapter VIII.5, pp. 474-485, 17 pages.

* cited by examiner

*Primary Examiner* — Amir Alavi
(74) *Attorney, Agent, or Firm* — Donna P. Suchy; Daniel M. Barbieri (57) ABSTRACT

A dynamic range optimization display system includes at least one processor coupled with a non-transitory processor-readable medium storing processor-executable code for causing the at least one processor to receive the input image data, generate a histogram of the input image based on the input pixel intensity values, modify the histogram to adjust the brightness and contrast of an output image, integrate the histogram to create a cumulative histogram, select a sequence of knots for an intensity transfer function, determine an input intensity for each knot, determine an output intensity for each knot, determine an output pixel intensity value for each pixel of the plurality of pixels by linearly interpolating the output pixel intensity value between output intensities of two bounding knots using an interpolant, and provide output image data to a display where the output image data is indicative of an output image having the determined output pixel intensity values.

20 Claims, 8 Drawing Sheets

| Bin | Intensity Range |
|---|---|
| 0 | 0 - 15 |
| 1 | 16 - 31 |
| 2 | 32 - 47 |
| 3 | 48 - 63 |
| 4 | 64 - 79 |
| 5 | 80 - 95 |
| 6 | 96 - 111 |
| 7 | 112 - 127 |
| 8 | 128 - 143 |
| 9 | 144 - 159 |
| 10 | 160 - 175 |
| 11 | 176 - 191 |
| 12 | 192 - 207 |
| 13 | 208 - 223 |
| 14 | 224 - 239 |
| 15 | 240 - 255 |

| Sequence Number | Input Intensity | Output Intensity |
|---|---|---|
| 0 | 16 (Bin 1 is 16-31; first sample takes the lowest intensity for the bin) | 0 (lowest possible display intensity) |
| 1 | 62 (48 + 9/10 x 16) | 16 (1 x 16) |
| 2 | 82 (80 + 2/14 x 16) | 32 (2 x 16) |
| 3 | 100 (96 + 4/15 x 16) | 48 (3 x 16) |
| 4 | 117 (112 + 5/17 x 16) | 64 (4 x 16) |
| 5 | 132 (128 + 4/15 x 16) | 80 (5 x 16) |
| 6 | 150 (144 + 5/13 x 16) | 96 (6 x 16) |
| 7 | 174 (160 + 8/9 x 16) | 112 (7 x 16) |
| 8 | 239 (Bin 14 is 224 -239, last sample takes the highest intensity for the bin) | 127 (highest possible display intensity) |

DYNAMIC RANGE OPTIMIZATION

BACKGROUND

The inventive concepts disclosed herein relate generally to the field of display systems. More particularly, embodiments of the inventive concepts disclosed herein relate to an apparatus for and method of adjusting the dynamic range of an input image so that an output image has a dynamic range that is optimized for being displayed on a particular display device.

Displays are utilized in a wide variety of applications including but not limited to medical, military, avionic, entertainment and computing applications. Raw sensor imagery produced by thermal sensors (e.g. infrared devices) typically has high dynamic range that is greater than the dynamic range that can be presented on some display devices. For example, the Rockwell Collins EP-80 Image Generation System produces simulated image sensory data having a high dynamic range that may be higher than some aircraft cockpit simulator display systems are configured to display. Some image generators create imagery having up to 16 bits per pixel while some display systems are only capable of displaying 8 bits per pixel. Sensor devices may use image processing techniques to reduce the dynamic range of high dynamic range sensor imagery, which certain displays may not support, to a lower dynamic range that is more commonly supported by aircraft display systems. For example, some systems adjust the pixel intensities of an image by using image gain and level mechanisms to convert high dynamic range imagery to low dynamic range imagery capable of being viewed on a low dynamic range display device. However, using gain and level mechanisms to adjust pixel intensities often results in discarding or obscuring information outside of certain image intensity ranges by overly saturating the image with a few predominant pixel intensity levels.

Typically, dynamic range compression reduces the number of bits per pixel, or the number of gray levels (e.g., in a grayscale image) that can be shown in an image. Some image processing techniques use histogram equalization to dynamically compress the intensity range of an image from high dynamic range imagery to low dynamic range imagery. Histogram equalization may be used to compress the intensity range of an image by substituting the intensity of each pixel with a new intensity based on certain mathematical relationships. For example, one well known image processing technique that employs histogram equalization is known as Contrast Limited Adaptive Histogram Equalization ("CLAHE"). However, histogram equalization requires large amounts of computing resources (specifically the amount of data required to represent the pixel intensity transfer function(s)) to adjust the dynamic range of an image and can produce unacceptable levels of intensity quantization resulting in images that are blocky, blurry, pixelated, or otherwise having less than ideal image quality and resolution. Intensity quantization is a form of aliasing that occurs when a number of adjacent intensities from the original image are forced to be the same intensity in the output image.

A need exists for a dynamic range optimization system capable of converting high dynamic range images to low dynamic range images using fewer computing resources than current systems. A further need exists for a dynamic range optimization system that provides clearer output images by reducing intensity quantization and preserving all or most of the input image detail.

SUMMARY

In one aspect, embodiments of the inventive concepts disclosed herein are directed to a dynamic range optimization display system. A dynamic range optimization display system includes at least one processor coupled with a non-transitory processor-readable medium storing processor-executable code for causing the at least one processor to receive input image data indicative of an input image that includes a plurality of pixels. Each pixel is associated with an input pixel intensity value. The processor-executable code also causes the at least one processor to generate a histogram of the input image based on the input pixel intensity values. The histogram is indicative of a total number of pixels associated with each input pixel intensity value from the input image and each pixel intensity value is associated with an intensity bin indicative of an intensity range. The processor-executable code also causes the at least one processor to modify the histogram to adjust the brightness and contrast of an output image, integrate the histogram to create a cumulative histogram, and select a sequence of knots for an intensity transfer function. Each knot of the sequence of knots is associated with a sequence number. The processor-executable code also causes the at least one processor to determine an input intensity for each knot, determine an output intensity for each knot, determine an output pixel intensity value for each pixel of the plurality of pixels by linearly interpolating the output pixel intensity value between output intensities of two bounding knots using an interpolant, and provide output image data to a display. The output image data is indicative of an output image having the determined output pixel intensity values.

In a further aspect, embodiments of the inventive concepts disclosed herein are directed to a method for converting high dynamic range imagery to low dynamic range imagery. The method includes receiving input image data indicative of an input image that includes a plurality of pixels. Each pixel is associated with an input pixel intensity value. The method also includes generating a histogram of the input image based on the input pixel intensity values. The histogram is indicative of a total number of pixels associated with each input pixel intensity value from the input image and each pixel intensity value is associated with an intensity bin indicative of an intensity range. The method also includes modifying the histogram to adjust the brightness and contrast of an output image, integrating the histogram to create a cumulative histogram, and selecting a sequence of knots for an intensity transfer function. Each knot of the sequence of knots is associated with a sequence number. The method also includes determining an input intensity for each knot, determining an output intensity for each knot, determining an output pixel intensity value for each pixel of the plurality of pixels by linearly interpolating the output pixel intensity value between output intensities of two bounding knots using an interpolant, and providing output image data to a display. The output image data is indicative of an output image having the determined output pixel intensity values.

In another aspect, embodiments of the inventive concepts disclosed herein are directed to a display system. The display system includes a sensor, a display, and at least one processor. The sensor is configured to acquire input image data having a first dynamic range. The display is configured to display images having a second dynamic range. The at least one processor is coupled with the sensor, the display, and a non-transitory processor-readable medium storing processor-executable code for causing the at least one processor to receive input image data indicative of an input image that includes a plurality of pixels. Each pixel is associated with an input pixel intensity value. The processor-executable code also causes the at least one processor to generate a histogram of the input image based on the input pixel intensity values. The histogram is indicative of a total number of pixels associated with each input pixel intensity value from the input image and each pixel intensity value is associated with an intensity bin indicative of an intensity range. The processor-executable code also causes the at least one processor to modify the histogram to adjust the brightness and contrast of an output image, integrate the histogram to create a cumulative histogram, and select a sequence of knots for an intensity transfer function. Each knot of the sequence of knots is associated with a sequence number. The processor-executable code also causes the at least one processor to determine an input intensity for each knot, determine an output intensity for each knot, determine an output pixel intensity value for each pixel of the plurality of pixels by linearly interpolating the output pixel intensity value between output intensities of two bounding knots using an interpolant, and provide output image data to a display. The output image data is indicative of an output image having the determined output pixel intensity values.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate exemplary embodiments of the inventive concepts disclosed herein in detail, it should be understood that the inventive concepts are not limited to the details or methodology set forth in the description or illustrated in the figures. It should also be understood that the terminology is for the purpose of description only and should not be regarded as limiting. As discussed below, systems and methods contemplated herein are configured to convert input images having a first dynamic range to output images having a second dynamic range while avoiding intensity quantization and preserving all or most of the input image detail. The systems and methods according to the inventive concepts disclosed herein may be utilized in a number of display devices and for various types of applications or sensing systems. In some embodiments, systems and methods as described herein may be used for a flight display of an aircraft. According to various exemplary embodiments, systems and methods of the present disclosure may be used by any system in any other embodiment for acquiring sensor imagery or rendering computer graphics and displaying an output (e.g., in another aircraft, spacecraft, a ground-based vehicle).

The systems and methods according to the inventive concepts disclosed herein fundamentally change classical histogram equalization to address aliasing and quantization problems in output images. Classical histogram equalization methods use uniformly-spaced sampling of the input intensity domain, which is typically represented by the x-axis of a histogram. Using uniformly-spaced sampling of the input intensity domain results in more evenly distributed samples across the input intensity domain, but may result in output images that have too few intensities representing high detail areas and too many intensities representing low detail areas. The inventive concepts disclosed herein use uniform sampling of the input intensity count domain, which is typically represented by the y-axis of a histogram, so that a sample is taken every so many pixels in the histogram rather than at equally-spaced increments of intensity. In some embodiments, taking a sample may include computing one knot of a sequence of knots that make up a piecewise linear intensity transfer function. By taking samples or computing knots every so many pixels in the histogram, an input image having a non-uniform distribution of intensities results in non-uniform spacing of samples or knots in the input image intensity domain, which forces samples or knots to be concentrated in portions of the intensity domain that are more richly detailed. For example, if the majority of an input image has very low intensities and a very small portion of the input image has high intensities, classical histogram equalization methods sample both the low intensity region and the high intensity region equally, while embodiments including the inventive concepts disclosed herein sample the regions based on the number of pixels contained in the regions (e.g., sampling the low intensity region more than the high intensity region). The systems and methods according to the inventive concepts disclosed herein further reduce bandwidth requirements by reducing the amount of data that must be passed to hardware for enabling the hardware to perform intensity transformations as compared to methods using classical histogram equalization. In some embodiments, the bandwidth required is associated with the number of knots used. For example, using a relatively small number of knots (e.g., 9 knots) produces good results, though bandwidth requirements may be further reduced using fewer knots. Furthermore, relying on interpolation methods and mathematical formulas eliminates the need to transfer larger amounts of data to determine output intensities.

Figure 1:
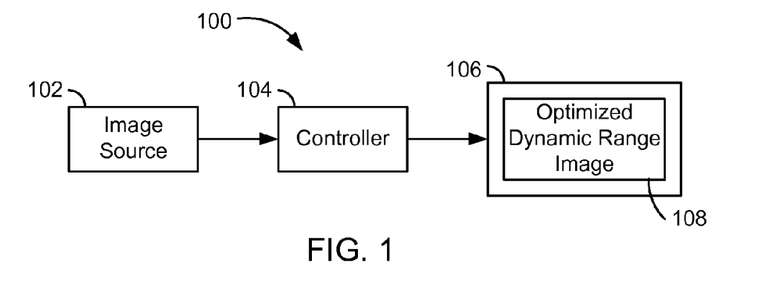
FIG. 1 is a block diagram of a dynamic range optimization display system including a controller, according to an exemplary embodiment.

Referring to FIG. 1, a block diagram of a dynamic range optimization display system 100 is shown, according to an exemplary embodiment. The dynamic range optimization display system 100 includes an image source 102, a controller 104, and a display 106. The dynamic range optimization display system 100 may be implemented in a wide variety of display systems that use optimized dynamic range images. For example, the dynamic range optimization display system 100 may be implemented in systems including but not limited to military targeting systems, medical imaging display systems, security systems, navigation systems, remote control systems, land-based vehicle heads up display ("HUD"), helmet-mounted display ("HMD"), or head down display systems, naval based vehicle HUD, HMD, or head down display systems, or aircraft HUD, HMD or head down display system.

The image source 102 may be any system onboard or external to a vehicle including the dynamic range optimization display system 100, such as an aircraft, and may include any source that is capable of providing image data to the controller 104, including an image sensor, a communication system, an image generator, and/or a database source. The image sensors may include any optical sensor, such as a camera sensor, an infrared sensor, a millimeter wave radar, and/or a low light level image intensifying sensor. In various embodiments, the image source 102 may include one or multiple image sensors. In one embodiment, the image source 102 includes multiple image sensors that may each be a different type of video camera, such as a visible camera, a short wave infrared camera, and a long wave infrared camera. In one embodiment, the image source 102 includes only a single camera, two cameras, or three or more cameras. In one embodiment, the image source 102 includes an image sensor configured to detect non-visible, near-infrared radiation such as that emitted by many runway and landing lights. The image sensor may include any type of sensing units that detect an aspect of an environment. In one embodiment, the image source 102 includes an image sensor mounted on an aircraft and configured to detect forward-looking external scene topography such as natural or manmade features of a place or region to show their relative positions and elevation with respect to the aircraft. The image source 102 may include a sensor configured to capture data representative of the actual scene in front of an aircraft.

The image source 102 is configured to provide image data indicative of an input image to the controller 104. In some embodiments, the input image is an image having a high dynamic range. In some embodiments, the input image is a high-dynamic range monochrome image. In some embodiments, the image data represents the input image as an array of intensity values, where each intensity value in the array corresponds with a pixel in the input image. In some embodiments, each intensity value in the array may represent the brightness of the corresponding pixel in the input image. For example, the intensity value of a pixel may range from zero to some upper limit (e.g., 255), where the intensity value of zero represents the lowest possible pixel intensity and the upper limit represents the highest possible pixel intensity. In some embodiments, each intensity value in the array has sufficient precision to represent more than 256 intensity levels. In some embodiments, each intensity value has a finite precision (i.e., a finite number of discrete intensities can be represented). In some embodiments, the number of binary bits per pixel used to represent each intensity value determines how many discrete intensity levels can be represented. For example, if using binary representation, each intensity value may have more than 8 bits per pixel to represent more than 256 discrete intensities (e.g., 16 bits per pixel permits a total of 65,536 possible discrete intensities). In some embodiments, all intensity values in the array have the same precision.

The controller 104 may be an electronic device, such as hardware, software, or a combination thereof suitable for processing input images to optimize the dynamic range of the input images. The controller 104 may be coupled to the display device 106 and structured to provide a display signal or data, such as a video signal which causes the display device 106 to display information or content. The information or content may include an optimized dynamic range image 108. In some embodiments, a single dynamic range image 108 (or a series of discrete images) may be optimized, while in other embodiments, the optimized dynamic range image 108 can be fused with other images including images having an optimized dynamic range, and/or with computer generated text, images, and symbology.

The display device 106 can be any type of display including light emitting diode (LED) based displays, liquid crystal displays (LCDs), and cathode ray tubes (CRTs). The display device 106 may be configured to display a variety of images having different bits per pixel. For example, in some embodiments, the display device 106 is configured to display images having up to 12 bits per pixel, which permits 4096 discrete intensity levels. In another example, the display device 106 may be configured to display images having only 8 bits per pixel, which permits a total of 256 available intensities. In another example, the display device 106 may be configured to display images having less than 8 bits per pixel (e.g., 4 bits per pixel, which permits a total of 16 available intensities).

In some embodiments, the display device 106 may be a monochrome display, while in other embodiments, the display device 106 may be a color display. In embodiments where the display device 106 is a color display, the color image may be represented in a color space that separates intensity or brightness from hue or chrominance, such as the YUV or HSV (hue-saturation-value) color space. The dynamic range compression operations could be performed on the intensity component of the color space (e.g., Y in YUV or V in HSV) and then converted back to the appropriate color space that the display device 106 requires.

Figure 2:
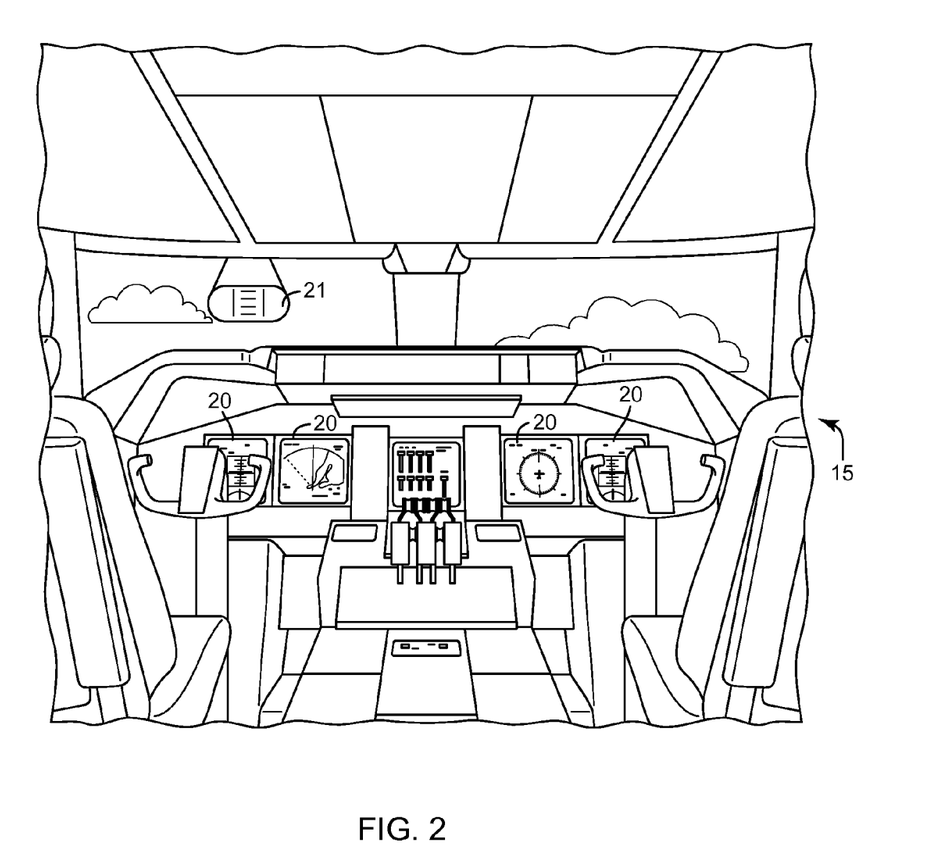
FIG. 2 is a perspective view schematic illustration of an aircraft control center or cockpit including the dynamic range optimization display system of FIG. 1, according to an exemplary embodiment.

Referring to FIG. 2, a perspective view schematic illustration of an aircraft control center or cockpit 15 is shown, according to an exemplary embodiment. The aircraft control center 15 includes flight displays 20. Flight displays 20 can be used to provide information to the flight crew, thereby increasing visual range and enhancing decision-making abilities. Any of flight displays 20 can be utilized as the display device 106 for the dynamic range optimization display system 100.

In one embodiment, the aircraft control center 15 includes a head up display (HUD) including a combiner 21 or a head worn display (e.g. a helmet mounted display (HMD) with or without a projector). A display, such as the display 106, can be configured to provide image content that is projected onto the combiner 21. The combiner 21 is a generally transparent medium that the flight crew can see through. The HUD is generally configured to display at least one of graphical and textual images or indicia and the optimized dynamic range image 108. Alternatively, the graphical and textual images or indicia and the optimized dynamic range image 108 can be provided to any one or more of displays 20. The images projected onto the combiner 21 may include optimized dynamic range images. For example, the combiner 21 may display navigational or guidance data overlaid onto a runway that the flight crew is viewing. The images may also be overlaid onto a view of terrain, other aircraft, cloud cover, low visibility conditions, and other hazards.

Figure 3:
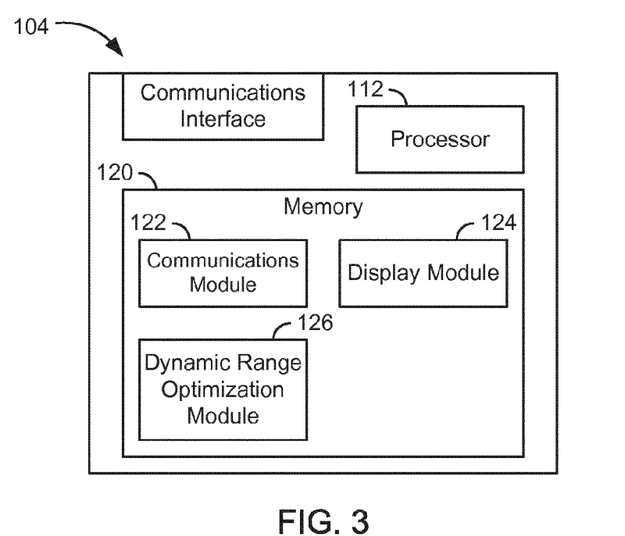
FIG. 3 is a block diagram of the controller of the dynamic range optimization display system, according to an exemplary embodiment.

Referring now to FIG. 3, a block diagram of the controller of the dynamic range optimization display system 100 is shown according to an exemplary embodiment. The controller 104 includes a processor 112, a communications interface 114, and a memory 120. The communications interface 114 is configured to facilitate communications with other components of the dynamic range optimization display system 100. The processor 112 may be coupled with the memory 120, which may comprise a non-transitory processor-readable medium storing processor-executable code and/or data. The processor 112 may be implemented as a specific purpose processor, an application specific integrated circuit ("ASIC"), one or more field programmable gate arrays ("FPGAs"), a group of processing components, or other suitable electronic processing components. Any controllers and modules described herein may be implemented as a hardware circuit comprising custom VLSI circuits or gate arrays, off-the-shelf semiconductors such as logic chips, transistors, or other discrete components, and may be implemented in programmable hardware devices such as field programmable gate arrays, programmable array logic, programmable logic devices or the like. The memory 120 is one or more devices (e.g., RAM, ROM, flash memory, hard disk storage) for storing data and/or computer code for completing and/or facilitating the various user or client processes, layers, and modules described in the present disclosure. The memory 120 may be or include volatile memory or non-volatile memory and may include database components, object code components, script components, or any other type of information structure for supporting the various activities and information structures of the present disclosure. The memory 120 is communicably connected to the processor 112 and includes computer code or instruction modules for executing one or more processes described herein.

The communications interface 114 may facilitate communications with other components of the dynamic range optimization display system 100. For example, the communications interface 114 may facilitate communications with the image source 102, the display device 106, and any other systems in a simulator or onboard an aircraft having the dynamic range optimization display system 100, such as communications systems, an avionics interface device, and user input devices. The communications interface 114 may be configured to receive image input from the image source 102 (e.g., sensor input from a sensor, imagery from an image generator, or stored image data from a database), and to communicate information to and from the display device 106 and user input devices via a wired or wireless connection. The communications interface 114 may include any type of wired or wireless technology for facilitating communications, including electronic and optical communication protocols.

The memory 120 is shown to include various modules for determining properties related to optimizing the dynamic range of images, including a communications module 122, a display module 124, a dynamic range optimization module 126. The communications module 122 may be configured to control or communicate with a communications system onboard an aircraft or in a simulator having the dynamic range optimization display system 100, for example, to send and/or receive data (e.g., including image data) via a satellite system, other aircraft, or a terrestrial station based on a user input received from the display device 106 or a user input device. The display module 124 may be configured to generate display data and provide the display data to a display system. For example, in some embodiments, the display module 124 interacts with the dynamic range optimization module 126 to generate display data based on sensor input data that the controller 104 receives from the image source 102.

In some embodiments, the communications module 122 is configured to control an onboard communication system to acquire, gather, generate, analyze, process, or otherwise configure data for being displayed on the display device 106. In some embodiments, the data is displayed in real time. The communications module 122 may be configured to receive, process, and/or analyze data acquired by sensors or ground based communication systems, or produced by an image generator. For example, data may be acquired by at least one of ACARS, a mobile network, via ARINC 429 and/or ARINC 717 standards, an internal GPS system, an external GPS system, a propriety data acquisition unit, such as a proprietary flight management system developed by Rockwell Collins or other supplier of avionic equipment.

The dynamic range optimization module 126 may be configured to receive image data from the input source 102 and to optimize the image data to provide an optimized dynamic range image 108 to the display device 106. In some embodiments, the dynamic range optimization module 126 receives image data from the image source 102 via the communications interface 114 and/or the communications module 122. In some embodiments, the dynamic range optimization module 126 generates or otherwise provides image data to the display device 106 via the display module 124. In one embodiment, the dynamic range optimization module 126 is hardware or software code configured to select relevant portions of the image data from the image source 102 and insert only those relevant portions into the video signal for the display device 106. It will be appreciated that although the processor 112 is depicted as a single unit, a composition of two or more separate processing units can perform the processing functions of the processor 112, either in whole or in part. Further, the dynamic range optimization module may be executed, in whole or in part, in a processor outside of the processor 112 without departing from the scope of the inventive concepts disclosed herein. According to one embodiment, the dynamic range optimization display system 100 can be provided as part of or integrated with other systems associated with the application of the dynamic range optimization display system 100.

In some embodiments, the dynamic range optimization module 126 receives input image data from a sensor and the input image data is indicative of an image having a plurality of pixels, where each pixel is associated with a pixel intensity value indicative of the intensity of the pixel. The dynamic range optimization module 126 is configured to adjust the dynamic range of an input image from a first dynamic range to a second dynamic range. In some embodiments, the dynamic range optimization module 126 adjusts the dynamic range of an input image from a first, higher, dynamic range to a second, lower, dynamic range using the modified histogram equalization methods disclosed herein. For example, the dynamic range optimization module 126 may receive input image data having a high dynamic range from a sensor (e.g., an infrared sensor) and then substitute the pixel intensity value of each pixel of the input imagery with a new intensity value using modified histogram equalization to transform the image to have a dynamic range appropriate for display on the display device 106.

Referring back to FIG. 3, after receiving an input image, the dynamic range optimization module 126 processes the input image to reduce the dynamic range of the input image in a manner that optimizes the preservation of detail of the input image. In some embodiments, the input image is divided into sections or tiles, an intensity transfer function is computed for each section or tile, and, for each pixel in the input image, a pixel intensity for the output image is computed using the intensity transfer function associated with each tile. In some embodiments, the sections or tiles are rectangular or square shaped though it will be appreciated that sections or tiles having other shapes may be used. In some embodiments, the input image is not divided into sections or tiles before determining the intensity transfer function.

In some embodiments, the size of the sections or tiles is measured so that each section or tile includes the same or substantially the same number of pixels. In some embodiments, the sections or tiles are determined based on the number of horizontal pixels and/or the number of vertical pixels. In some embodiments, the number of vertical pixels may be different from the number of horizontal pixels. In some embodiments, the number of horizontal and vertical pixels per section or tile is configurable. For example, the number of pixels and or section or tile shape may be based on a user input, a type of image, and/or a characteristic of the output image (e.g., the desired amount of detail in the output image).

In some embodiments, the sections or tiles may all be the same size. One or more vertical columns of pixels on the left and/or right of the input images may be excluded from sections or tiles (e.g., if the horizontal size of the input image is not evenly divisible by the horizontal tile size). One or more horizontal rows of pixels on the top and/or bottom of the input image may be excluded from the sections or tiles (e.g., if the vertical size of the input image is not evenly divisible by the vertical tile size).

In some embodiments, the sections or tiles may not all be the same size. Tiles at the left edge and/or the right edge of the input image may be horizontally larger to account for input images having a total number of horizontal pixels that are not evenly divisible by the number of horizontal pixels per section or tile. Tiles at the top edge and/or the bottom edge may be vertically larger to account for input images having a total number of vertical pixels that are not evenly divisible by the number of vertical pixels per section or tile.

The dynamic range optimization module 126 may be configured to use an intensity transfer function for each section or tile to reduce the dynamic range of the input image. The intensity transfer function may consist of a set of piecewise linear knots computed by the dynamic range optimization module 126. The number of knots may be configurable. For example, the number of knots used in the transfer function may be based on a user input, a type of image, and/or a characteristic of the output image. A different number of knots used in the transfer function may be desired because in some embodiments more knots may produce output images having a higher fidelity. Fewer knots may be used if an output image having a lower fidelity is acceptable. The number of knots used by the transfer function may directly correlate with the quality of the output image and the processing power required by the dynamic range optimization module 126 to dynamically optimize an input image because the fewer knots used in the transfer function results in less data being computed from the input image and therefore less data being used by the dynamic range optimization module 126. In some embodiments, each knot consists of two intensity values, an input intensity value and an output intensity value. The input intensity value may have at least as much dynamic range as the intensity values in the input image. In some embodiments, the output intensity value may be computed based on the sequence number of the knot (e.g., the output intensity of the first knot is the minimum possible intensity of the output image, the output intensity of the last knot is the maximum possible intensity of the output image, and the output intensities of the intervening knots are evenly spaced between the output intensities of the first and last knots). In some embodiments, the output intensity value may have at least as much dynamic range as the intensity values of output image. In some embodiments, each knot is assigned a sequence number. In some embodiments, the sequence number is based on the order in which the knots are determined and may be numbered sequentially (e.g., the sequence number of the first knot is zero, the sequence number of the second knot is one, the sequence number of the third knot is two).

The dynamic range optimization module 126 may be configured to determine the set of piecewise linear knots by computing a histogram for the section or tile, modifying the histogram to control the brightness and contrast of the output image, and integrating or converting the histogram into a cumulative histogram. In some embodiments, the dynamic range optimization module 126 computes a histogram of the section or tile, which may be a linear array of integer values where each value is associated with a bin that represents a range of intensities. In some embodiments, the range of intensities represented by a bin is the total possible intensity range in the section or tile divided by the number of bins in the histogram. In some embodiments, the bins are ordered from the lowest range of intensities to the highest. In some embodiments, each bin in the computed histogram includes a count of the number of pixels in the tile that fall within the intensity range represented by the bin.

Figure 4:
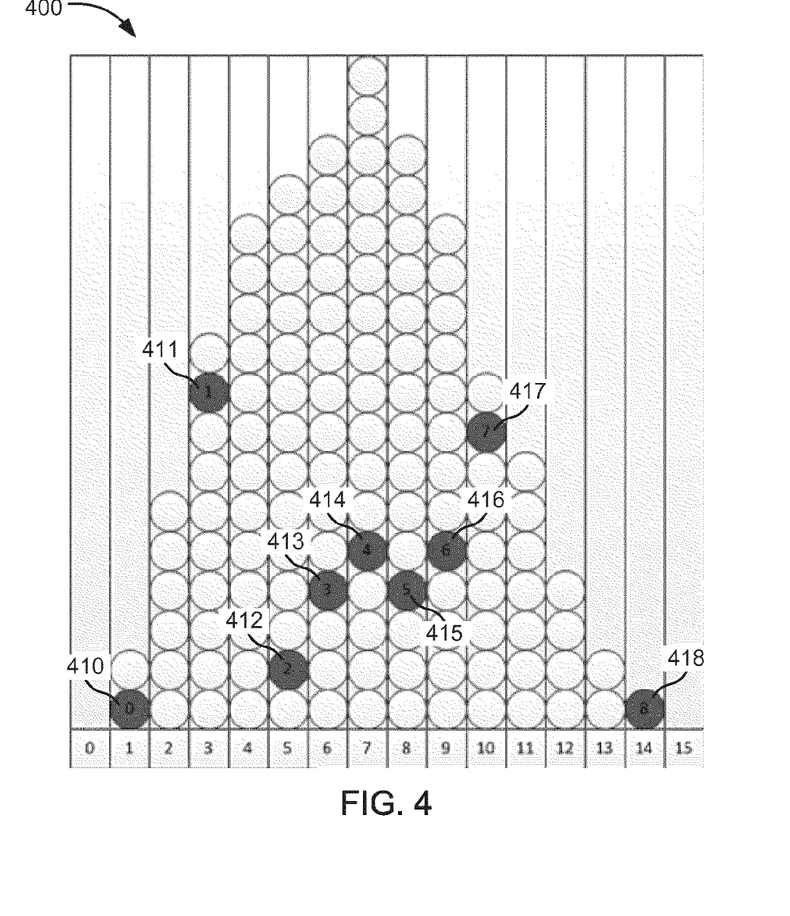
FIG. 4 is an illustration of a histogram of the pixel intensities for an input image, according to an exemplary embodiment.

Referring now to FIG. 4, an illustration of a histogram 400 of the pixel intensities for an input image is shown according to an exemplary embodiment. The histogram 400 includes a plurality of bins numbered 0-15 in which a plurality of pixel intensities from the input image are arranged. A number of knots 410, 411, 412, 413, 414, 415, 416, 417, 418 have been determined based on the distribution of the pixel intensities in the histogram 400. As shown, the knots 410, 411, 412, 413, 414, 415, 416, 417, 418 are spaced evenly or substantially evenly throughout the histogram (e.g., fourteen intensity values separate knot 410 and knot 411, fourteen intensity values separate knot 417 and knot 418, and fifteen intensity values separate the remaining knots). The example histogram 400 contains 128 total pixels with 8 bits of intensity per pixel (0-255), 16 bins each representing a continuous range of 16 intensities (i.e., 256/16=16 intensities).

Figure 5:
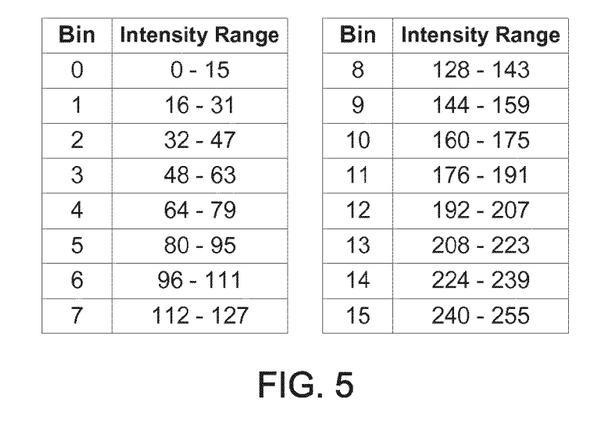
FIG. 5 is an illustration of a table of bins and intensity values associated with each bin of the histogram of FIG. 6, according to an exemplary embodiment.

Referring now to FIG. 5, an illustration of a table of bins and intensity values associated with each bin for the histogram 400 of FIG. 4 is shown accordingly to an exemplary embodiment. As shown, each of the bins is associated with a range of intensity values (e.g., bin 0 includes intensities ranging from 0-15, bin 1 includes intensities ranging from 16-31, bin 2 includes intensities ranging from 32-47).

Referring back to FIG. 3, the dynamic range optimization module 126 may be configured to modify the histogram (e.g., such as histogram 400) to control the brightness and contrast of the output image. In some embodiments, the histogram may be modified to control the brightness and contrast of the output image. In some embodiments, the histogram may be clipped using upper and lower clipping limits. For example, the upper clipping limit may represent the maximum value any bin may have (e.g., bins with higher values than the upper clipping limit have their values replaced with the upper clipping limit). In another example, the lower clipping limit may represent the minimum value any bin may have (e.g., bins with lower values than the lower clipping limit have their values replaced with the lower clipping limit). In some embodiments, the histogram is filtered using filtering methods known in the art. For example, a one-dimensional box filter may be used to filter the histogram. In some embodiments, characteristics of the filter may be configurable based on a user input, a type of the input image, or a characteristic of the output image (e.g., the width of the filter or filter type may be selected). In some embodiments, the histogram is integrated or converted to a cumulative histogram. After integrating or converting the histogram to a cumulative histogram, each bin of the cumulative histogram will be the value of the corresponding bin from the original histogram plus the sum of all the lower intensity bins from the original histogram.

Figure 6:
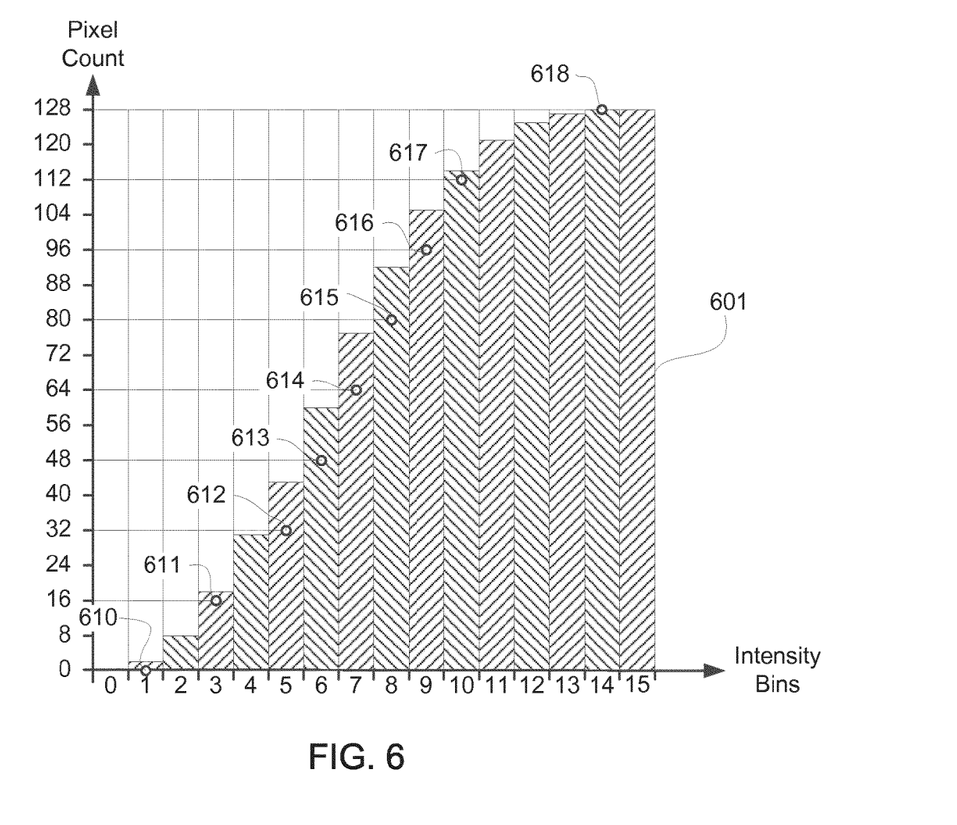
FIG. 6 is an illustration of a cumulative histogram of the histogram of FIG. 4, according to an exemplary embodiment.

Referring now to FIG. 6, an illustration of a cumulative histogram 601 of the histogram 400 of FIG. 4 is shown according to an exemplary embodiment. The cumulative histogram 601 includes a plurality of knots 610, 611, 612, 613, 614, 615, 616, 617, 618 associated with corresponding knots 410, 411, 412, 413, 414, 415, 416, 417, 418, respectively, from the histogram 400 of FIG. 4. The knots shown in the cumulative histogram 601 are equally spaced with respect to the vertical axis (cumulative pixel count), as indicated by the horizontal lines extending from the knots 610, 611, 612, 613, 614, 615, 616, 617, 618. As shown, the knots are at non-uniform intervals through the input image intensity domain, which is represented by the horizontal axis.

Figure 7:
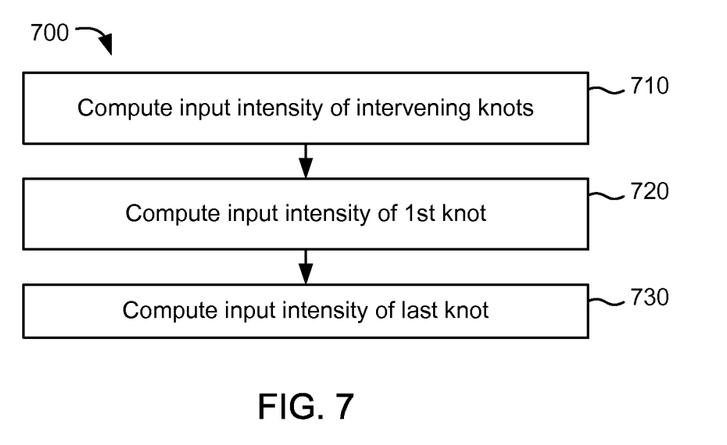
FIG. 7 is a flow diagram of a process for computing the input intensity of knots using the dynamic range optimization display system 100, according to an exemplary embodiment.

In some embodiments, the dynamic range optimization module 126 may be configured to compute the knots in a variety of orders. In some embodiments, the dynamic range optimization module 126 computes the knots in sequential order. Referring now to FIG. 7, in some embodiments, the dynamic range optimization module 126 computes the knots according to a process 700. The dynamic range optimization module 126 first computes the input intensity value of the intervening knots between the first knot and the last knot (710), then computes the input intensity value of the first knot (720), and finally computes the input intensity value of the last knot (730).

The dynamic range optimization module 126 may compute the number of pixels between knots (710) by dividing the number of pixels in the section or tile by one less than the total number of knots. The number of pixels in a display section or tile may be different from the number of pixels in the histogram due to clipping and/or filtering of the histogram. A target pixel sum is then computed for each knot by multiplying the sequence number of the knot by the number of pixels between knots. For example, in some embodiments, the histogram bin into which the target sum falls is the bin whose value is less than or equal to the target sum when the value of the next histogram bin is greater than the target sum.

In some embodiments, the dynamic range optimization module 126 computes a high-precision input intensity by performing a linear interpolation on the high-precision intensity range of the histogram bin using the relative position of the target sum within the bin as an interpolant. For example, to compute the input intensity of a knot for a 16 bit image (65,536 possible intensities) using linear interpolation, the dynamic range optimization module 126 computes an 8 bit histogram having 256 bins, where each bin represents 256 discrete intensities in the input image, and then integrates the histogram to create the cumulative histogram. Assuming one knot corresponds to the 200th pixel in bin number 120, which has a total pixel count of 800 pixels, the input intensity is calculated to be 30,784 (i.e., bin 120 represents intensities from 120×256=30,720 to 121×256=30,976; the interpolant is 200/800=0.25; the input intensity of the sample is 30,720+ 0.25×(30,976−30,720)=30,784).

The dynamic range optimization module 126 may determine the input intensity of the first knot (720) to be the lowest original intensity value from the section or tile. If the lowest original intensity value is higher than the input intensity of the second knot, it may instead be set to a value slightly lower than the input intensity of the second knot to make the piecewise linear function monotonic.

The dynamic range optimization module 126 may determine the input intensity of the last knot (730) to be the highest original intensity value from the section or tile. If the highest original intensity value is lower than the input intensity of the penultimate knot, it may instead be set to a value slightly higher than the input intensity of the penultimate knot to make the piecewise linear function monotonic.

In some embodiments, the dynamic range optimization module 126 is configured to determine, for each pixel in the input image, a pixel intensity for the output image based on the intensity transfer functions computed for each section or tile. Any number of transfer functions may be used to determine the intermediate intensity values for each output pixel, and the number of transfer functions used may depend on where the pixel lies with respect to section or tile boundaries. For example, if the pixel is not in any sections or tiles (e.g., the pixel lies on an edge of the input image that is not included in any tile), the pixel is treated as if the edge of the sections or tiles extended to the edge of the image. In another example, if the pixel is in a corner section or tile, and if the pixel is in the outside corner quadrant of the section or tile, only the transfer function for the corner tile in which the pixel is in is used to determine the pixel intensity of the output image. In another example, if the pixel is in a tile on the edge of the image, if the pixel is not in a corner tile, and if the pixel is in the half of the tile closest to the edge, two transfer functions may be used: a first transfer function from the section or tile containing the pixel, and a second transfer function from the neighbor section or tile nearest to the pixel that is also an edge tile. In another example, for all other pixels, four transfer functions are used: a first transfer function from the section or tile containing the pixel, and a second, third, and fourth transfer function from the three closest neighboring sections or tiles. When four transfer functions are used to determine the intensity of the output pixel, one of the second, third, and fourth transfer functions will be from a corner neighboring section or tile (e.g., sharing a corner with the section or tile containing the pixel) and the remaining two transfer functions will be from an edge neighboring section or tile (e.g., sharing an edge with the section or tile containing the pixel).

In some embodiments, the following mathematical relationship may determine the output intensity for each knot:

$$\text{intensityOut} = \text{sequenceNumber} \cdot \text{intensityMax}/n{-}1$$

where sequenceNumber is the sequence number of the knot, intensityMax is the maximum output intensity, and n is the number of knots. Accordingly, the knots are distributed uniformly in the output intensity domain with the first sample (sequence number=0) having an output intensity of 0 and the final sample having an output intensity of intensityMax.

In some embodiments, the dynamic range optimization module 126 is configured to use the transfer functions to compute an interim pixel output intensity value using the original pixel intensity as the input. The transfer function operations may be configured to compute the output intensity values to have a desired dynamic range. For example, the output intensity values may be computed to have a low dynamic range, or the output intensity values may be computed to have a high dynamic range. If the output intensity values are computed to have a high dynamic range, the high dynamic range intensity values may be subsequently converted to a lower desired dynamic range by clipping. For example, if the dynamic range optimization module 126 computes the output intensities at 16 bits per pixel, and if a final output image having 8 bits per pixel is desired, the dynamic range optimization module 126 may clip the dynamic range by using the most significant 8 bits of data and discarding the remaining data.

The dynamic range optimization module 126 first selects two contiguous knots bounding the input intensity value and then computes the pixel output intensity through linear interpolation. For example, the input intensity of the lower knot may be less than or equal to the input intensity of the pixel and the input intensity of the upper knot may be greater than the input intensity of the pixel (i.e., the sequence number of the lower knot is one less than the sequence number of the upper knot). The dynamic range optimization module 126 then determines the pixel output intensity as the linear interpolation between the output intensities of the two bounding knots. For example, the dynamic range optimization module 126 uses the value of the input pixel intensity relative to the input intensities of the two bounding knots as the interpolant for determining the pixel output intensity.

Figure 8:
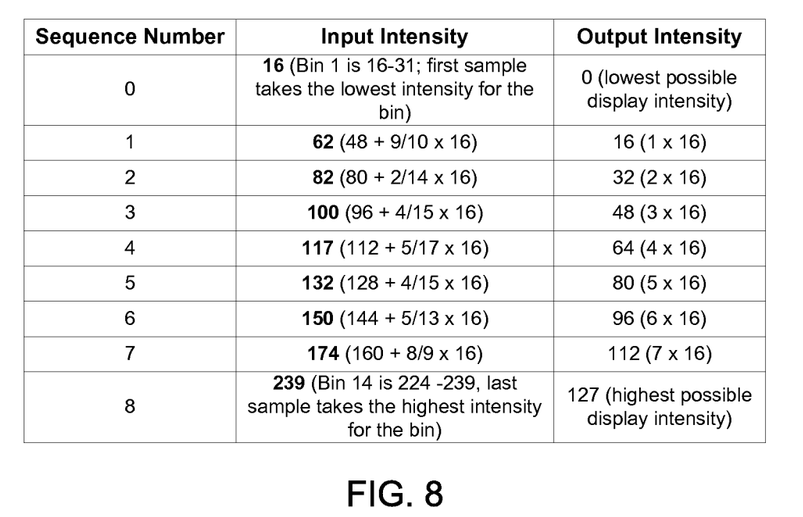
FIG. 8 is an illustration of a table of input and output intensity calculations for the histogram of the pixel intensities for the input image of FIG. 4, according to an exemplary embodiment.

Referring now to FIG. 8, an illustration of a table of input and output intensity calculations for the histogram 400 of the pixel intensities for the input image of FIG. 46 is shown according to an exemplary embodiment. First, a linear interpolant that expresses the position of the intensity to be transformed relative to the input intensities of the two knots is computed. For example, if the intensity to be transformed is ¼ of the way from the input intensity of the lower knot to the input intensity of the upper knot, the interpolant is ¼ (i.e., 0.25). The interpolant is used to interpolate between the output intensities associated with the two knots. For example, if the interpolant is 0.25, the new intensity will be ¼ of the way from the lower knot's output intensity to the upper knot's output intensity.

In some embodiments, the dynamic range optimization module 126 is configured to determine the output intensity value of a pixel by blending the intermediate intensity values if the dynamic range optimization module 126 uses more than one transfer function for the pixel. If only one transfer function is used to compute one intermediate intensity value, then the one intermediate intensity value is used as the output intensity value and no blending is necessary. If two transfer functions are used to compute two intermediate intensity values, the output intensity value may be computed as a linear interpolation of the two intermediate intensity values by using the position of the pixel relative to the centers of the two corresponding sections or tiles as the interpolant. If four transfer functions are used to compute four intermediate intensity values, the output intensity value may be computed by a bilinear interpolation of the intermediate intensity values based on the position of the pixel relative to the centers of the four corresponding sections or tiles.

The dynamic range optimization module 126 is configured to provide an output image having the calculated output intensities. In some embodiments, the output image having the calculated output intensities comprises a low dynamic range image. In some embodiments, the low dynamic range image is a low dynamic range monochrome image. In some embodiments, the output image has the same number of pixels and the same number of rows and columns of pixels as the input image. In some embodiments, the output image is cropped or otherwise has fewer pixels than the input image. Each pixel of the output image has an intensity value of sufficient precision to match the dynamic range of a display for displaying the output image (e.g., the display device 106).

Figure 9:
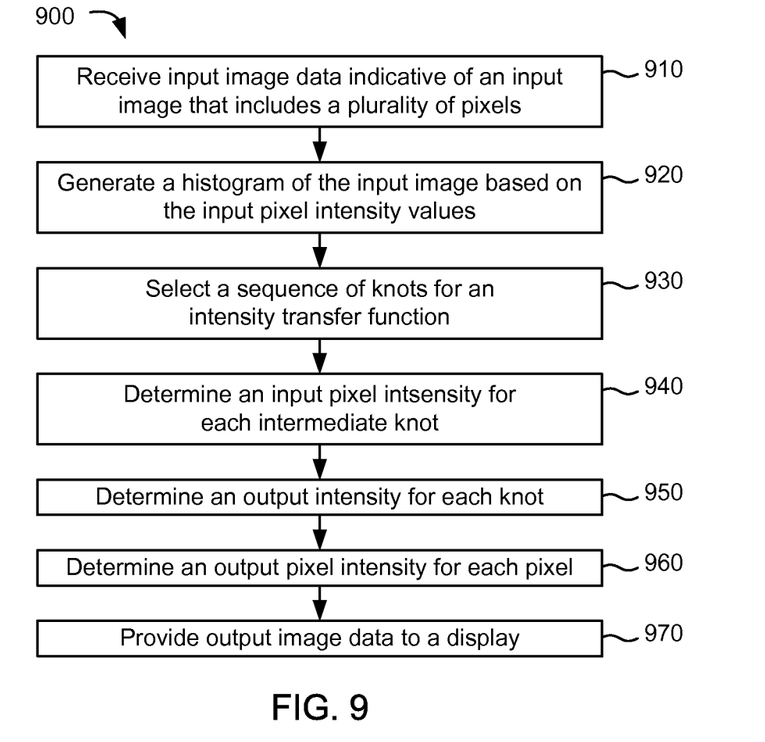
FIG. 9 is a flow diagram of a process for converting high dynamic range imagery to low dynamic range imagery, according to an exemplary embodiment.

Referring now to FIG. 9, a flow diagram of a process 900 for converting high dynamic range imagery to low dynamic range imagery is shown according to an exemplary embodiment. The process 900 may be implemented using any of the systems/apparatuses disclosed herein, and may include those onboard an aircraft, using the dynamic range optimization display system 100, the controller 104 of the dynamic range optimization display system 100, or any components thereof, such as the dynamic range optimization module 126. The process 900 includes receiving input image data indicative of an input image that includes a plurality of pixels (910). Each of the pixels is associated with an input pixel intensity value. The process 900 further includes generating a histogram of the input image based on the input pixel intensity values (920). The histogram may be indicative of a total number of pixels associated with each input pixel intensity value from the input image. Each pixel intensity value may be associated with a bin indicative of an intensity range. The process 900 further includes selecting a sequence of knots for an intensity transfer function (930). Each knot of the sequence of knots may be associated with a sequence number. The process 900 further includes determining an input intensity for each knot (940). The process 900 further includes determining an output pixel intensity for each knot (950). The output pixel intensity for each knot may be determined by multiplying the sequence number of the knot by a maximum output intensity and dividing by a number one less than the number of knots in the sequence of knots. The process 900 further includes determining an output pixel intensity value for each pixel of the plurality of pixels by linearly interpolating between output intensities of two bounding knots using an interpolant (960). The interpolant may be the value of the input pixel intensity relative to the input intensities of the two bounding knots. The process 900 further includes providing output image data to a display (970). The output image data is indicative of an output image having the determined output pixel intensity values.

In alternative embodiments using histogram equalization, the following mathematical relationship may be used to substitute each pixel's intensity with a new intensity:

$$x' = \frac{\sum_{i=0}^{x} n_i}{\text{totalPixelCount}} \cdot \text{intensityMax}$$

where x is an intensity from the original image, x' is the intensity that will replace x, $n_i$ is the number of pixels at intensity i, totalPixelCount is the total number of pixels in the image, and intensityMax is the maximum output intensity.

According to an alternative embodiment, a process for substituting the pixel intensity value of each pixel of an image using the dynamic range optimization display system 100 includes determining the intensity for each pixel in the original image, determining the number of pixels in the image with the same or lower intensity, and determining an intensity ratio by dividing the sum of pixels in the image with the same or lower intensity by the total number of pixels in the image. For example, the pixel intensity ratio may be in the range of 0.0 to 1.0. The process further includes determining an output intensity by multiplying the intensity ratio by the maximum intensity of the output image and replacing the input pixel intensity of each pixel with the determined output intensity.

According to another alternative embodiment, a process for substituting the pixel intensity value of each pixel of an image uses a lookup table of the dynamic range optimization display system 100. The process includes creating a histogram of an input image by determining the total number of pixels for each of a set of equal-sized ranges of pixel intensities, which results in an array of pixel counts. The address of the array may be equal to an intensity range and the contents of the array include the number of pixels in the image that fall within that intensity range. The process further includes converting the histogram to a cumulative histogram that counts the cumulative number of pixel intensities over the range of all pixel intensities in the input image. Converting the histogram to a cumulative histogram may include looping through the array and adding the pixel intensity count of the previous array location to the pixel intensity count of the current array location. The process further includes determining output intensities by multiplying each value in the cumulative histogram by a scale factor. For example, the scale factor may represent a ratio between the maximum intensity of the image and the total number of pixels in the image. The process further includes replacing the pixel intensity of each pixel in the original image with the corresponding pixel intensity from the scaled array. For example, the scaled array may function as a look up table or an intensity transfer function.

Figure 10A:
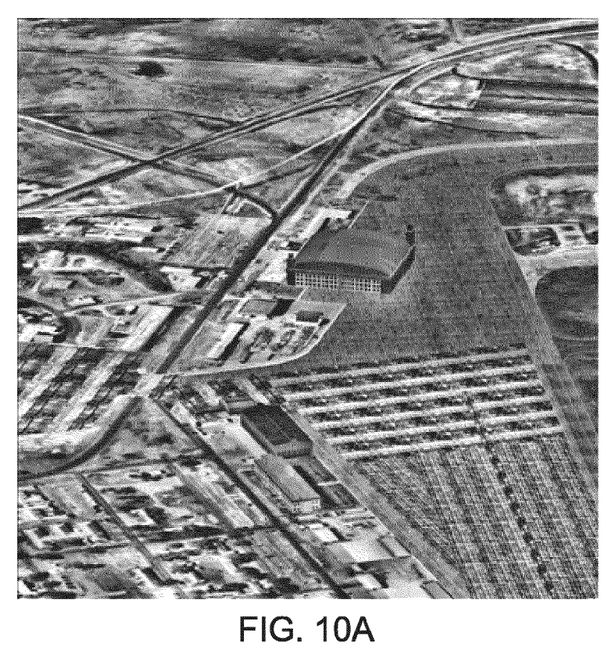
FIG. 10A is an illustration of an airfield image optimized using a prior art histogram equalization method.
Figure 10B:
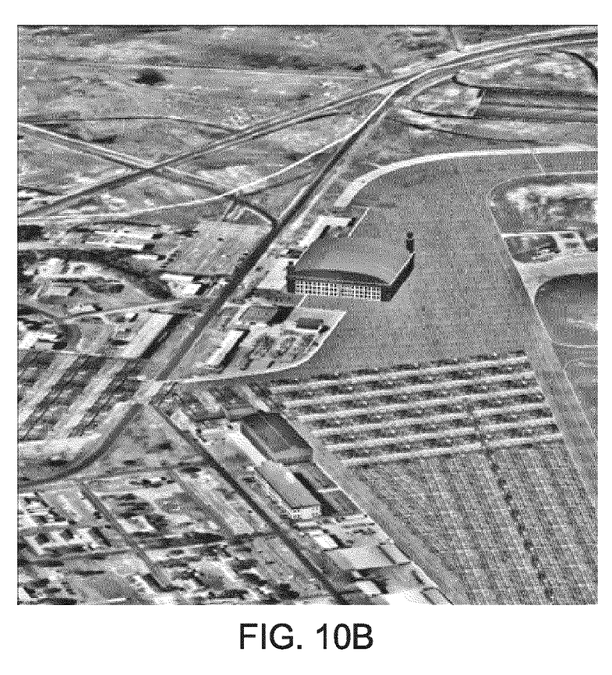
FIG. 10B is an illustration of the airfield image optimized using the controller of the dynamic range optimization display system of FIG. 1, according to an exemplary embodiment.
Figure 11A:
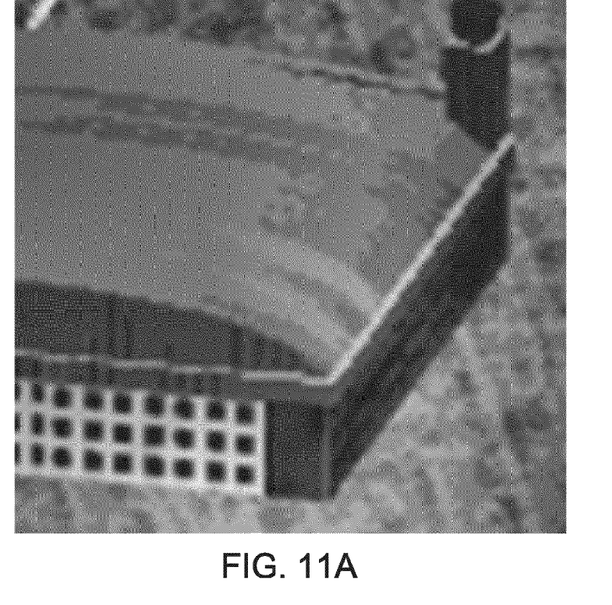
FIG. 11A is a zoomed in perspective of the airfield image of FIG. 10A.
Figure 11B:
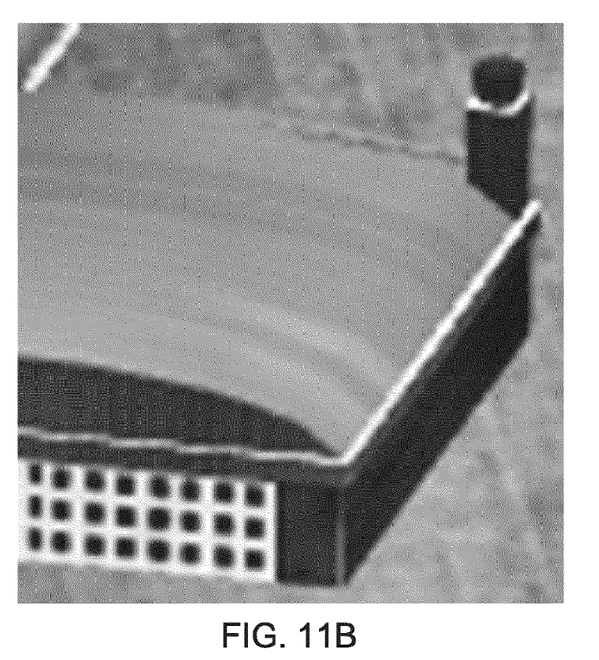
FIG. 11B is a zoomed in perspective of the airfield image of FIG. 10B.

Referring now to FIGS. 10A-12B, illustrations of images optimized by prior art histogram equalization methods and images optimized using the controller of the dynamic range optimization display system of FIG. 1 are shown according to exemplary embodiments. Specifically referring to FIGS. 10A-10B, an illustration of an airfield image optimized using a prior art histogram equalization method (FIG. 10A) is shown in comparison to an illustration of the airfield image optimized using the controller of the dynamic range optimization display system 100 (FIG. 10B). Specifically referring to FIGS. 11A-11B, zoomed in perspectives of the airfield images of FIGS. 10A-10B are shown. As shown, the airfield image optimized using the controller of the dynamic range optimization display system 100 is of a better quality as the prior art histogram equalization method results in an image that is quantized, which is particularly apparent in FIG. 11A.

Figure 12A:
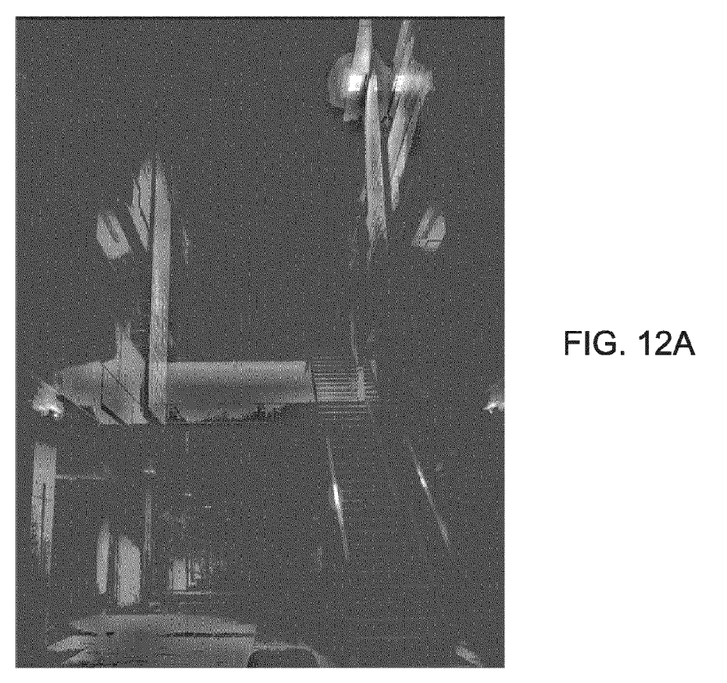
FIG. 12A is an illustration of a photorealistic image that has been optimized using a prior art histogram equalization method.
Figure 12B:
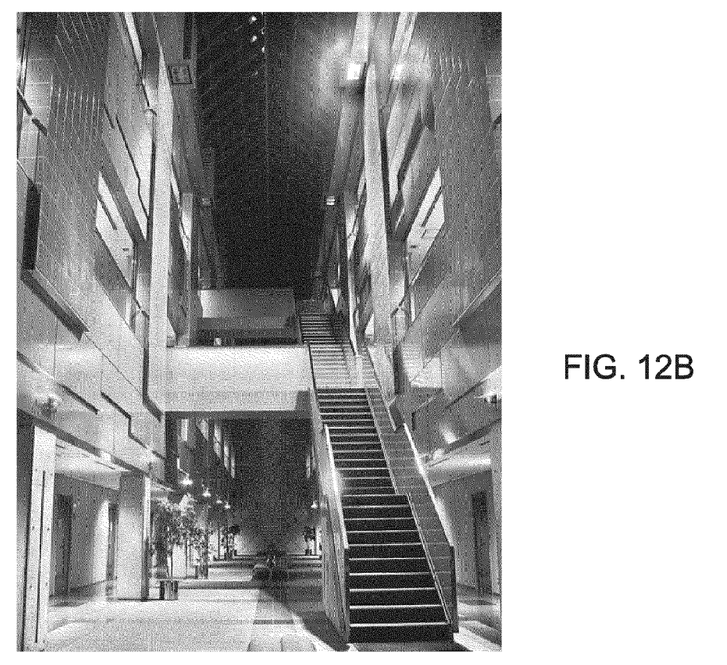
FIG. 12B is an illustration of the photorealistic image optimized using the controller of the dynamic range optimization display system of FIG. 1, according to an exemplary embodiment.

Specifically referring to FIGS. 12A-12B, an illustration of a photorealistic image that has been optimized using a prior art histogram equalization method (FIG. 12A) is shown in comparison to an illustration of the photorealistic image optimized using the controller of the dynamic range optimization display system of FIG. 1 (FIG. 12B). Photorealistic images tend to concentrate detail at the low end of the intensity spectrum. As a result, the prior art histogram equalization method outputs a dark image due to the sample points being evenly spread throughout the intensity domain, while the image optimized using the controller of the dynamic range optimization display system 100 has more output intensities in the low end of the intensity spectrum and therefore preserves more useful image information while at the same time dramatically reduces the dynamic range of the entire image.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on machine-readable media capable of accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a special purpose computer or other special purpose machine with a processor. By way of example, such machine-readable storage media may include RAM, ROM, EPROM, EEPROM, CD ROM or other optical disk storage, magnetic disk storage or other magnetic storage devices, or any other medium which may be used to carry or store desired program code in the form of machine-executable instructions or data structures and which may be accessed by a special purpose computer or other special purpose machine with a processor. Combinations of the above are also included within the scope of machine-readable storage media. Machine-executable instructions include, for example, instructions and data which cause a special purpose computer or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, and so on, that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments may use computer networks, intranets, and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a special purpose computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A dynamic range optimization display system, comprising:
   at least one processor coupled with a non-transitory processor-readable medium storing processor-executable code for causing the at least one processor to:
      receive input image data indicative of an input image that includes a plurality of pixels, each pixel being associated with an input pixel intensity value;
      generate a histogram of the input image based on the input pixel intensity values, wherein the histogram is indicative of a total number of pixels associated with each input pixel intensity value from the input image, and wherein each pixel intensity value is associated with an intensity bin indicative of an intensity range;
      modify the histogram to adjust the brightness and contrast of an output image;
      integrate the histogram to create a cumulative histogram;
      select a sequence of knots for an intensity transfer function, wherein each knot of the sequence of knots is associated with a sequence number;
      determine an input intensity for each knot;
      determine an output intensity for each knot;
      determine an output pixel intensity value for each pixel of the plurality of pixels by linearly interpolating the output pixel intensity value between output intensities of two bounding knots using an interpolant; and
      provide output image data to a display, wherein the output image data is indicative of an output image having the determined output pixel intensity values.

2. The system of claim 1, wherein the input intensity for each knot is determined by determining a target pixel count for the knot; determining an intensity bin in the cumulative histogram that contains the target pixel count; and linearly interpolating between a range of image intensities represented by the intensity bin that contains the target pixel count.

3. The system of claim 2, wherein the determining a target pixel count for the knot comprises multiplying the sequence number of the knot by the total number of pixels in the input image and dividing by one less than the number of knots.

4. The system of claim 2, wherein the interpolating uses a second interpolant that comprises the relative position of the target pixel count within the intensity bin.

5. The system of claim 1, wherein the output intensity for each knot is determined by multiplying the sequence number of the knot by a maximum output intensity and dividing by a number one less than the number of knots in the sequence of knots.

6. The system of claim 1, wherein the interpolant is the value of the input pixel intensity relative to the input intensities of the two bounding knots.

7. The system of claim 1, wherein selecting the sequence of knots includes:
   selecting a first knot associated with a lowest intensity value from the input image;
   selecting a last knot associated with a highest intensity value from the input image; and
   selecting at least one intermediate knot associated with an intensity value from the input image falling between the lowest and highest intensity values, wherein the at least one intermediate knot is evenly distributed among the cumulative count of intensity values between the first knot and the last knot.

8. The system of claim 1, wherein the input image has a first dynamic range and the output image has a second dynamic range.

9. The system of claim 8, wherein the second dynamic range is lower than the first dynamic range.

10. A method for converting high dynamic range imagery to low dynamic range imagery, comprising:
    receiving input image data indicative of an input image that includes a plurality of pixels, each pixel being associated with an input pixel intensity value;
    generating a histogram of the input image based on the input pixel intensity values, wherein the histogram is indicative of a total number of pixels associated with each input pixel intensity value from the input image, and wherein each pixel intensity value is associated with an intensity bin indicative of an intensity range;
    modifying the histogram to adjust the brightness and contrast of an output image;
    integrating the histogram to create a cumulative histogram;
    selecting a sequence of knots for an intensity transfer function, wherein each knot of the sequence of knots is associated with a sequence number;

determining an input intensity for each knot;
determining an output intensity for each knot;
determining an output pixel intensity value for each pixel of the plurality of pixels by linearly interpolating the output pixel intensity value between output intensities of two bounding knots using an interpolant; and
providing output image data to a display, wherein the output image data is indicative of an output image having the determined output pixel intensity values.

11. The method of claim 10, wherein the determining an input intensity for each knot comprises:
determining a target pixel count for the knot;
determining an intensity bin in the cumulative histogram that contains the target pixel count; and
linearly interpolating between a range of image intensities represented by the intensity bin that contains the target pixel count.

12. The method of claim 11, wherein the determining a target pixel count for the knot comprises multiplying the sequence number of the knot by the total number of pixels in the input image and dividing by one less than the number of knots.

13. The method of claim 10, wherein the determining an output intensity for each knot comprises multiplying the sequence number of the knot by a maximum output intensity and dividing by a number one less than the number of knots in the sequence of knots.

14. The method of claim 10, wherein selecting the sequence of knots includes:
selecting a first knot associated with a lowest intensity value from the input image;
selecting a last knot associated with a highest intensity value from the input image; and
selecting at least one intermediate knot associated with an intensity value from the input image falling between the lowest and highest intensity values, wherein the at least one intermediate knot is evenly distributed among the cumulative count of intensity values between the first knot and the last knot.

15. The method of claim 10, wherein the input image has a first dynamic range and the output image has a second dynamic range.

16. A display system, comprising:
a sensor configured to acquire input image data having a first dynamic range;
a display configured to display images having a second dynamic range; and
at least one processor coupled with the sensor, the display, and a non-transitory processor-readable medium storing processor-executable code for causing the at least one processor to:
receive the input image data indicative of an input image that includes a plurality of pixels, each pixel being associated with an input pixel intensity value;
generate a histogram of the input image based on the input pixel intensity values, wherein the histogram is indicative of a total number of pixels associated with each input pixel intensity value from the input image, and wherein each pixel intensity value is associated with an intensity bin indicative of an intensity range;
modify the histogram to adjust the brightness and contrast of an output image;
integrate the histogram to create a cumulative histogram;
select a sequence of knots for an intensity transfer function, wherein each knot of the sequence of knots is associated with a sequence number;
determine an input intensity for each knot;
determine an output intensity for each knot;
determine an output pixel intensity value for each pixel of the plurality of pixels by linearly interpolating the output pixel intensity value between output intensities of two bounding knots using an interpolant; and
provide output image data to a display, wherein the output image data is indicative of an output image having the determined output pixel intensity values, and wherein the output image has the second dynamic range.

17. The system of claim 16, wherein the input intensity for each knot is determined by determining a target pixel count for the knot; determining an intensity bin in the cumulative histogram that contains the target pixel count; and linearly interpolating between a range of image intensities represented by the intensity bin that contains the target pixel count.

18. The system of claim 16, wherein the output intensity for each knot is determined by multiplying the sequence number of the knot by a maximum output intensity and dividing by a number one less than the number of knots in the sequence of knots.

19. The system of claim 16, wherein selecting the sequence of knots includes:
selecting a first knot associated with a lowest intensity value from the input image;
selecting a last knot associated with a highest intensity value from the input image; and
selecting at least one intermediate knot associated with an intensity value from the input image falling between the lowest and highest intensity values, wherein the at least one intermediate knot is evenly distributed among the cumulative count of intensity values between the first knot and the last knot.

20. The system of claim 16, wherein the second dynamic range is lower than the first dynamic range.

* * * * *